US007716668B2

(12) United States Patent
Moore et al.

(10) Patent No.: US 7,716,668 B2
(45) Date of Patent: May 11, 2010

(54) SYSTEM AND METHOD FOR SCHEDULING THREAD EXECUTION

(75) Inventors: Mark Justin Moore, Cambridge (GB); Brian James Knight, Cambridge (GB)

(73) Assignee: Brooktree Broadband Holding, Inc., Newport Beach, CA (US)

(*) Notice: Subject to any disclaimer, the term of this patent is extended or adjusted under 35 U.S.C. 154(b) by 1819 days.

(21) Appl. No.: 10/735,678

(22) Filed: Dec. 16, 2003

(65) Prior Publication Data

US 2004/0187120 A1    Sep. 23, 2004

Related U.S. Application Data

(60) Provisional application No. 60/319,788, filed on Dec. 16, 2002.

(51) Int. Cl.
*G06F 9/46* (2006.01)
(52) U.S. Cl. ........................ 718/104; 718/103
(58) Field of Classification Search ................ 718/102, 718/103, 104, 100
See application file for complete search history.

(56) References Cited

U.S. PATENT DOCUMENTS

| | | | | |
|---|---|---|---|---|
| 5,313,647 A | * | 5/1994 | Kaufman et al. | ............ 718/102 |
| 5,386,561 A | * | 1/1995 | Huynh et al. | ............... 718/103 |
| 5,528,513 A | | 6/1996 | Vaitzblit et al. | |
| 5,712,851 A | * | 1/1998 | Nguyen et al. | ............. 370/399 |
| 5,751,709 A | * | 5/1998 | Rathnavelu | ............... 370/395.4 |
| 5,953,336 A | | 9/1999 | Moore et al. | |
| 6,006,247 A | * | 12/1999 | Browning et al. | ........... 718/102 |

(Continued)

FOREIGN PATENT DOCUMENTS

EP    0806730    11/1997

(Continued)

OTHER PUBLICATIONS

European Search Report dated Jul. 2, 2004 for Application No. PCT/US03/39933.

*Primary Examiner*—Van H. Nguyen
*Assistant Examiner*—Caroline Arcos
(74) *Attorney, Agent, or Firm*—Thomas, Kayden, Horstemeyer & Risley, LLP

(57) ABSTRACT

A circular array structure is maintained having multiple time slots, where each time slot corresponds to a timeslice during which CPU resources are allocated to a particular thread. The time slots in the circular array include a queue of threads scheduled for execution during that time slot. A pointer index and an array of threads requesting immediate CPU resource allocation are maintained. A currently executing thread is suspended, and a next time slot during which the currently executing thread should resume execution is calculated. The suspended currently executing thread is appended to the queue of threads scheduled for execution at the calculated time slot. The pointer index is undated to point to the identified next sequential non-empty time slot. Any contents of the indexed time slot is appended to the array of threads requesting immediate CPU resource allocation. The thread at the top of the array is removed and activated.

18 Claims, 8 Drawing Sheets

Ring structure maintains scheduling information for tasks requesting CPU time at some point in the future FIFO structure maintains list of threads requesting CPU time immediately

U.S. PATENT DOCUMENTS

| | | | |
|---|---|---|---|
| 6,021,425 A | | 2/2000 | Waldron, III et al. |
| 6,108,683 A | | 8/2000 | Kamada et al. |
| 6,145,061 A | * | 11/2000 | Garcia et al. ................ 711/154 |
| 6,964,046 B1 | * | 11/2005 | Ogus et al. ................. 718/102 |
| 7,346,080 B2 | * | 3/2008 | Klotsche .................... 370/498 |
| 2002/0191952 A1 | * | 12/2002 | Fiore et al. ................... 386/46 |
| 2004/0064676 A1 | * | 4/2004 | Burugula et al. .............. 712/30 |
| 2004/0205753 A1 | * | 10/2004 | Moore ....................... 718/100 |

FOREIGN PATENT DOCUMENTS

| | | |
|---|---|---|
| EP | 1037146 | 9/2000 |
| EP | 1130877 | 9/2001 |

\* cited by examiner

SYSTEM AND METHOD FOR SCHEDULING THREAD EXECUTION

CROSS-REFERENCE TO RELATED APPLICATIONS

The following applications claims priority to U.S. Provisional Patent Application No. 60/319,788, filed Dec. 16, 2002, the entirety of which is incorporated by reference herein.

BACKGROUND OF THE INVENTION

The present invention relates generally to the field of computer systems and, more particularly, to systems for scheduling process execution to provide optimal performance of the computer system.

The operation of modern computer systems is typically governed by an operating system (OS) software program which essentially acts as an interface between the system resources and hardware and the various applications which make requirements of these resources. Easily recognizable examples of such programs include Microsoft Windows™, UNIX, DOS, VxWorks, and Linux, although numerous additional operating systems have been developed for meeting the specific demands and requirements of various products and devices. In general, operating systems perform the basic tasks which enable software applications to utilize hardware or software resources, such as managing I/O devices, keeping track of files and directories in system memory, and managing the resources which must be shared between the various applications running on the system. Operating systems also generally attempt to ensure that different applications running at the same time do not interfere with each other and that the system is secure from unauthorized use.

Depending upon the requirements of the system in which they are installed, operating systems can take several forms. For example, a multi-user operating system allows two or more users to run programs at the same time. A multiprocessing operating systems supports running a single application across multiple hardware processors (CPUs). A multitasking operating system enables more than one application to run concurrently on the operating system without interference. A multithreading operating system enables different parts of a single application to run concurrently. Real time operating systems (RTOS) execute tasks in a predictable, deterministic period of time. Most modern operating systems attempt to fulfill several of these roles simultaneously, with varying degrees of success.

Of particular interest to the present invention are operating systems which optimally schedule the execution of several tasks or threads concurrently and in substantially real-time. These operating systems generally include a thread scheduling application to handle this process. In general, the thread scheduler multiplexes each single CPU resource between many different software entities (the 'threads') each of which appears to its software to have exclusive access to its own CPU. One such method of scheduling thread or task execution is disclosed in U.S. Pat. No. 6,108,683 (the '683 patent). In the '683 patent, decisions on thread or task execution are made based upon a strict priority scheme for all of the various processes to be executed. By assigning such priorities, high priority tasks (such as video or voice applications) are guaranteed service before non critical or real-time applications. Unfortunately, such a strict priority system fails to address the processing needs of lesser priority tasks which may be running concurrently. Such a failure may result in the time-out or shut down of such processes which may be unacceptable to the operation of the system as a whole.

Another known system of scheduling task execution is disclosed in U.S. Pat. No. 5,528,513 (the '513 patent). In the '513 patent, decisions regarding task execution are initially made based upon the type of task requesting resources, with additional decisions being made in a round-robin fashion. If the task is an isochronous, or real-time task such as voice or video transmission, a priority is determined relative to other real-time tasks and any currently running general purpose tasks are preempted. If a new task is a general purpose or non-real-time task, resources are provided in a round robin fashion, with each task being serviced for a set period of time. Unfortunately, this method of scheduling task execution fails to fully address the issue of poor response latency in implementing hard real-time functions. Also, as noted above, extended resource allocation to real-time tasks may disadvantageously result in no resources being provided to lesser priority tasks.

Accordingly, there is a need in the art of computer systems for a system and method for scheduling the execution system processes which is both responsive to real-time requirements and also fair in its allocation of resources to non-real-time tasks.

SUMMARY OF THE INVENTION

The present invention overcomes the problems noted above, and realizes additional advantages, by providing for methods and systems for scheduling threads for a multitasking operating system. In particular, the method and system of the present invention preferably uses a rate-based scheduling algorithm to provide a flexible set of Quality of Service guarantees controlling the allocation of CPU to a thread, together with a mechanism to provide latency control for hard-real-time software. Additionally, the present invention is particularly suitable for use in systems where essentially all software runs under the control of the scheduler, from "interrupt handler" functions, though multimedia applications to simple "console" functions and non-real-time tasks. In an additional embodiment, the system and method of the present invention also actively limits the CPU time allocated to a given software thread to defend against malicious or accidental denial of service attacks.

Accordingly, it is one objective of the present invention to provide CPU quality of service guarantees to software threads running under an operating system. A second objective of the present invention is to provide mechanisms for statistical multiplexing of the CPU resource while also providing sustainable CPU resource guarantees. A third objective of the present invention is to provide near-zero response times when activating hard-real-time tasks such as interrupt handlers. A fourth objective of the present invention is to be capable of efficient implementation in a software implementation to be suitable for use in a hardware implementation or with a software scheduling co-processor.

BRIEF DESCRIPTION OF THE DRAWINGS

The present invention can be understood more completely by reading the following Detailed Description of the Preferred Embodiments, in conjunction with the accompanying drawings.

DETAILED DESCRIPTION OF THE INVENTION

Figure 1:
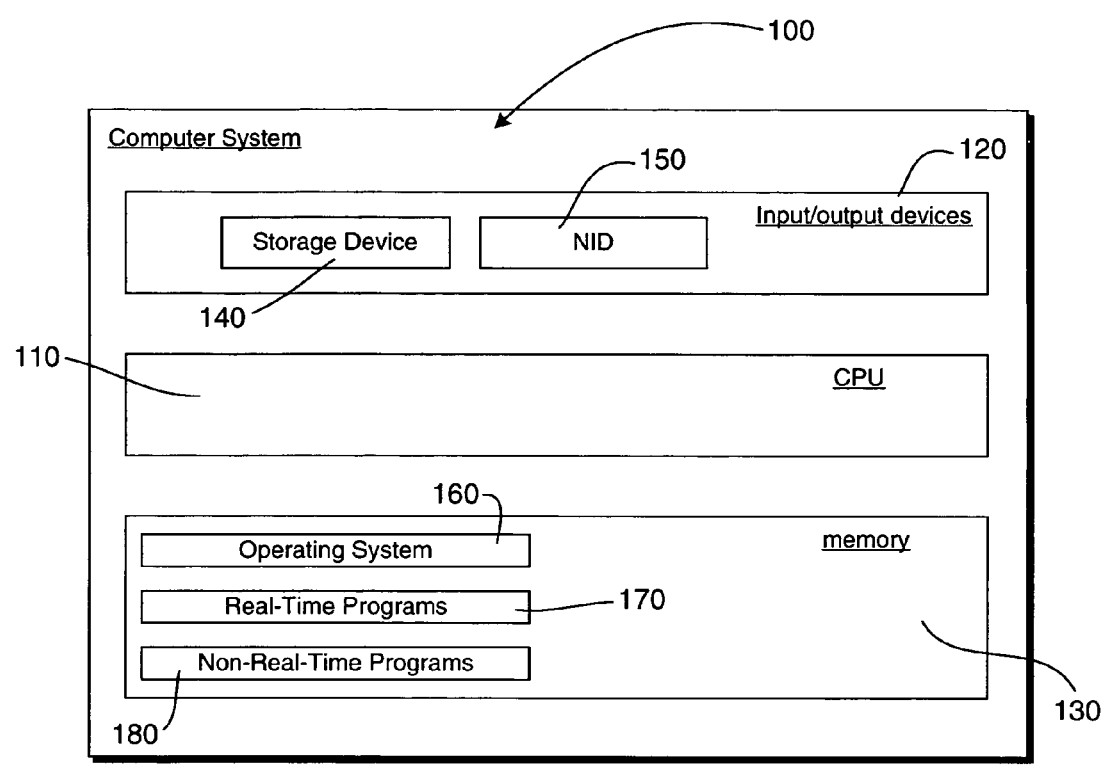
FIG. 1 is a high-level block diagram illustrating a computer system 100 for use with the present invention.

Referring now to the Figures and, in particular, to FIG. 1, there is shown a high-level block diagram illustrating a computer system 100 for use with the present invention. In particular, computer system 100 includes a central processing unit (CPU) 110, a plurality of input/output (I/O) devices 120, and memory 130. Included in the plurality of I/O devices are such devices as a storage device 140, and a network interface device (NID) 150. Memory 130 is typically used to store various applications or other instructions which, when invoked enable the CPU to perform various tasks. Among the applications stored in memory 130 are an operating system 160 which executes on the CPU and includes the thread scheduling application of the present invention. Additionally, memory 130 also includes various real-time programs 170 as well as non-real-time programs 180 which together share all the resources of the CPU. It is the various threads of programs 170 and 180 which are scheduled by the thread scheduler of the present invention.

Threads exist in three basic states: an inactive state wherein the thread is suspended and is not scheduled for execution; a runnable state in which the thread is requesting the CPU resource but is still not executing; and a running state in which the thread is executing and receiving the requested resources from the CPU. It should be understood that only one thread may be executing at any given point in time. Therefore, in order to properly service all threads requesting resources, threads must be transitioned between the runnable and running states. Further, although the above-described states represent the basic operating states of each thread, many systems incorporate additional states to represent various operating conditions and behaviors, such as during thread initialization and termination. However, such additional states are not directly relevant to the present invention.

Figure 2:
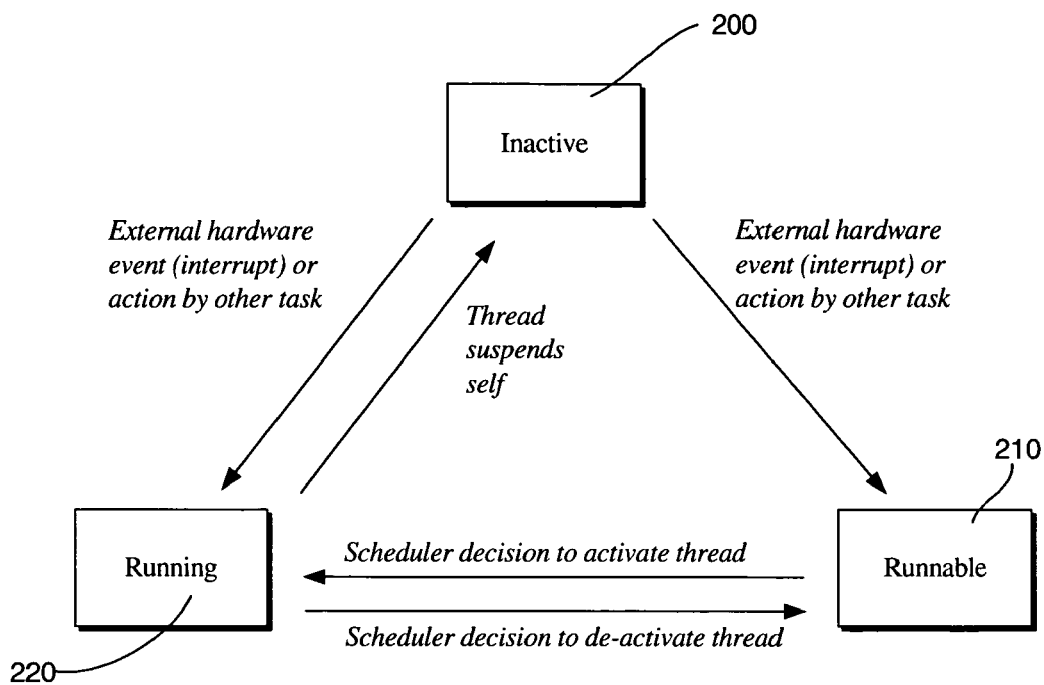
FIG. 2 is a simplified flow diagram illustrating possible thread state transitions.

Referring now to FIG. 2, there is shown a simplified flow diagram illustrating possible thread state transitions. As described briefly above, an initial thread state 200, represents an inactive state where the thread is neither requesting nor receiving any CPU resources. Threads currently in the inactive state 200 may transition to either the runnable state 210 or the running state 220 once an event occurs upon which CPU resources are required. Such an event may be an external hardware event, such as an interrupt or an action by another task.

Whether a thread transitions to the running or runnable state depends upon the thread scheduling scheme established for the system. The details of this scheduling scheme are set forth in additional detail below. Further, threads may transition between the running and runnable states at the discretion of the thread scheduler. However, once threads are out of the inactive state, they may not transition back to the inactive state except through a direct action of the thread itself. This can only happen if the thread is currently in a running state. The thread scheduler does not have the ability to transition threads to the inactive state.

Figure 3:
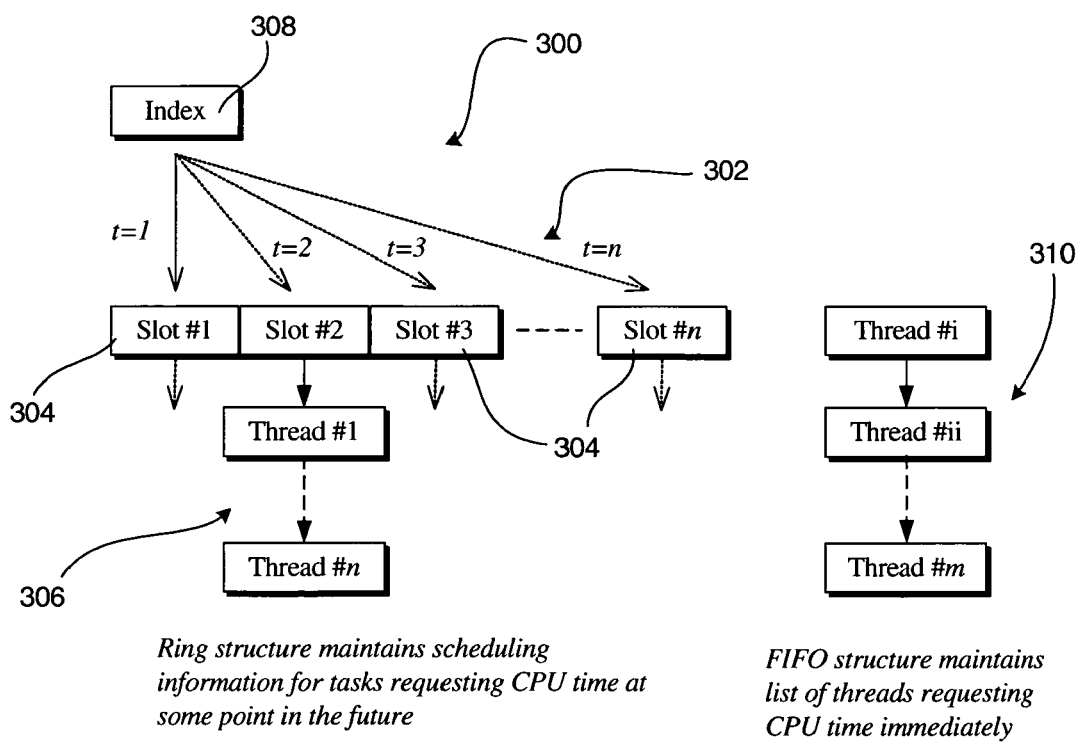
FIG. 3 is a block diagram illustrating one embodiment of an event scheduler structure for use in scheduling thread execution.

Turning now to FIG. 3, there is shown a block diagram illustrating one embodiment of an event scheduler structure for use in scheduling thread execution in accordance with the present invention. In particular, the event scheduler structure 300 is configured to include a circular array 302 having a plurality of time slots 304, each slot 304 corresponding to a timeslice during which CPU resources are allocated to a particular thread. Each slot in the array includes a queue of threads 306 which are scheduled for execution during that particular time slot. A pointer index 308 is maintained to reference one point in the circular array. This pointer index 308 is advanced by one position either when the currently executing thread suspends itself or after a given time interval has expired since the thread was first made runnable. In a preferred embodiment, this period is 10 to 1000 µS. In an ideal system the period should approach zero, however, practicality requires that the actual period is chosen to ensure that the CPU overheads associated with the scheduling algorithm and thread context switching are small in comparison to the CPU time available to application code.

In one embodiment of the present invention, the number of available slots 304 in array 302 is a fixed parameter (possibly in-built in to a hardware design). However, it should be understood that the number of slots is not critical, although a larger number simplifies support of applications with low CPU bandwidth requirements. In a preferred embodiment, a total of 32 slots 304 may be implemented efficiently on a 32 bit processor in software, and is sufficient to permit CPU resource allocation with a resolution of 100/32 or roughly 3%. Regarding the number of threads 306 in the system, this number may be left unbounded and is limited only by the available memory resources.

The presence of a thread in a queue on a given slot entry constitutes a request to make that thread current at the next time that slot is reached. If several threads are present at the same point, they are implemented in a strict FIFO (first in, first out) sequence 310 on subsequent time slots, until all such threads have been executed. Regarding de-activation, there is no explicit de-activation marker for any thread. Rather, a thread that is running will continue to execute until either it suspends itself or it is pre-empted by another thread that has been signaled by the scheduler. Note that it is also possible for no thread to be executing. In this circumstance, the system can handle this by either implementing at least one task (an idle task) that never suspends itself, or by implementing a hardware suspend ("sleep") operation from within the scheduler itself, with the benefit of reducing power consumption during the sleep period. Alternatively, the idle task itself may implement a more sophisticated use of the hardware sleep mechanisms, although specifics of this embodiment are outside the scope of the present invention.

Figure 4:
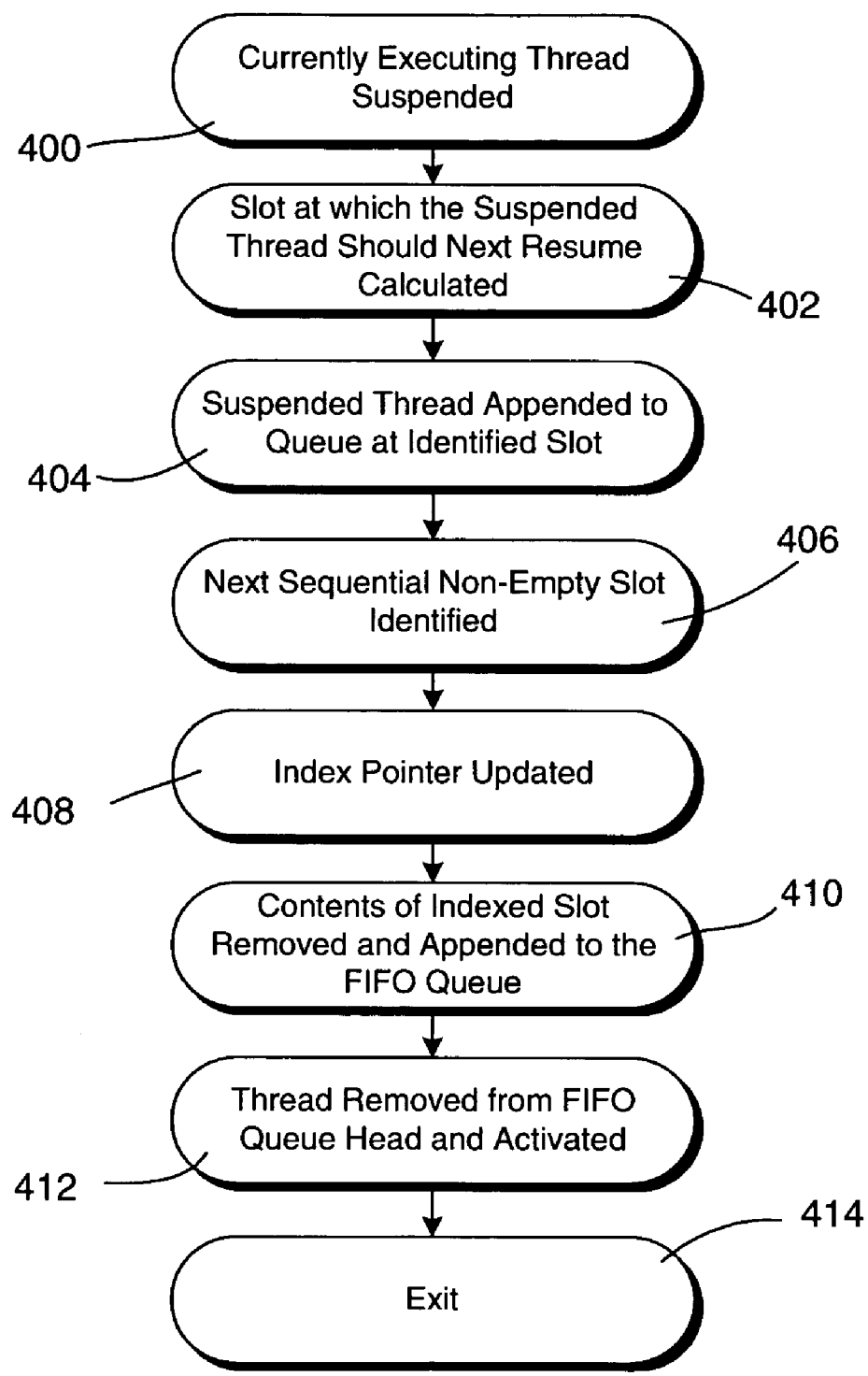
FIG. 4 is a flow diagram illustrating one embodiment of a method for selecting the next thread to run.

As described above, several threads may be queued on any given time slot, although only one may be running at any given time. It is therefore necessary to maintain a FIFO 310 of threads that are ready to be run for each slot. Referring now to FIG. 4, there is shown a flow diagram illustrating one embodiment of a method for selecting the next thread to run. Initially, at each periodic time interval, the currently executing thread is suspended in step 400. Next, the slot at which the suspended thread should next resume execution is calculated in step 402. Specific details regarding step 402 will be set forth in additional detail below. Once the slot is identified in step 402, the suspended thread is then appended to the queue at that slot in step 404.

Next, in step 406, the next sequential non-empty slot is identified and the index value of the pointer is updated to that slot in step 408. In step 410, any contents of the indexed slot are removed and appended to the FIFO queue for the indexed slot. Next, in step 412, the thread is removed from the head of the FIFO queue and activated as the currently running thread. The process then exits in step 414.

It should be understood that if there is only one active thread, a redundant thread suspend and activate is generated. The point of this process being that if there's only one thread, the basic algorithm described in connection with FIG. 4 is unnecessary and inefficient. More particularly, the embodiment of FIG. 4 suspends the current thread before it works out whether there is anything to do. Accordingly, if there is only one thread, the process will suspend that thread (which will involve saving all the CPU registers to memory) and then activate it again (which will mean reading all the register values back from memory). In order to avoid this redundancy, the process may be optimized by reordering the steps so that the next step on the process is determined prior to thread suspension, followed by executing the determined action, if necessary. One embodiment of this process simply utilizes the above algorithm to determine the threads to suspend and resume and, if they are the same, doing nothing, otherwise performing the operations at the exit point.

Figure 5:
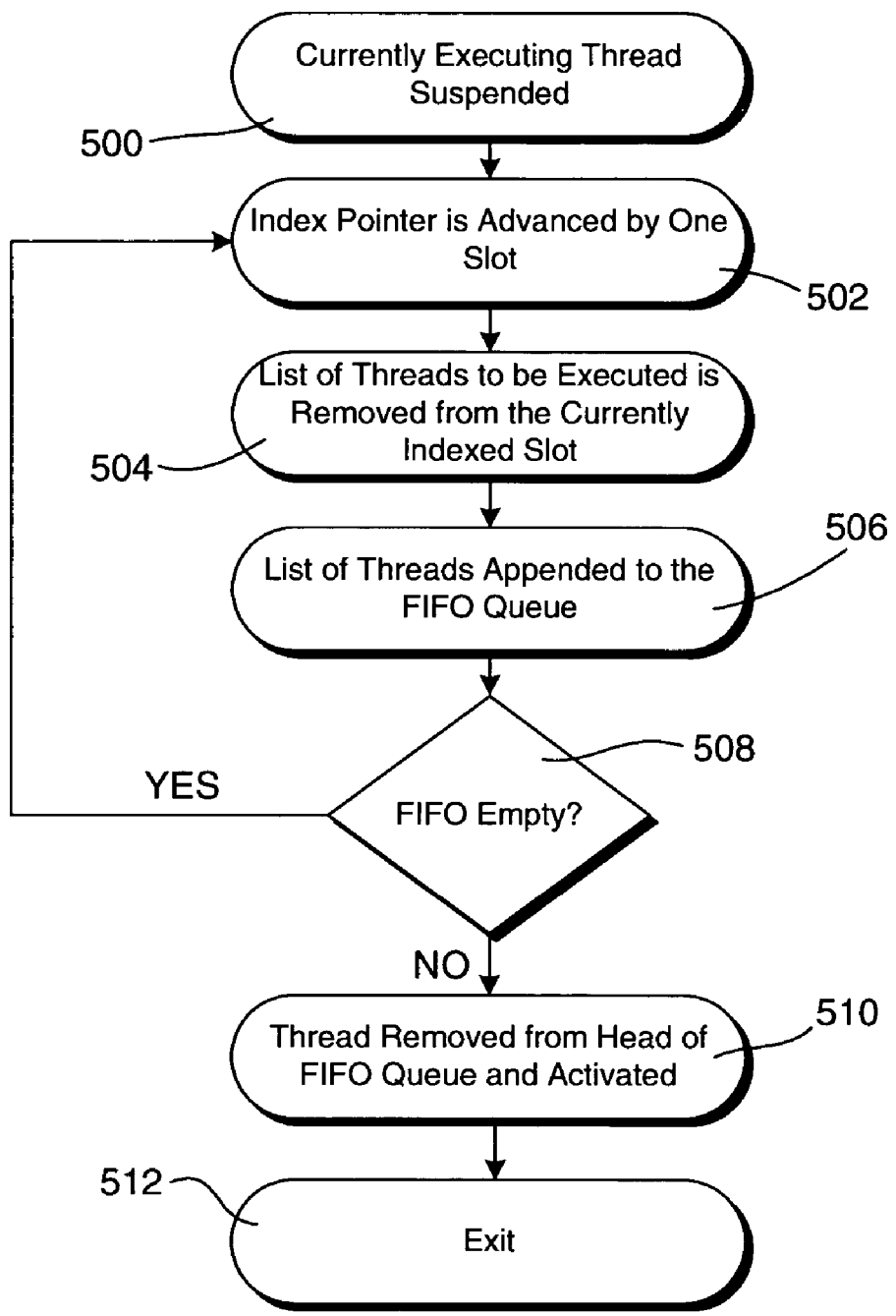
FIG. 5 is a flow diagram illustrating one embodiment of a method for selecting the next thread to run wherein multiple threads request execution at a given time slot.

In addition to scenarios wherein multiple threads request execution at a given time slot, currently running threads may also explicitly request self-suspension, thereby transitioning the process to the next time slot. Referring now to FIG. 5, there is shown a flow diagram illustrating one embodiment of a method for selecting the next thread to run in such a circumstance. Initially, in step 500, the currently executing thread is suspended. Next, the index pointer is advance in the timing ring by one slot in step 502. In step 504, the list of threads to be executed is removed from the time slot at the current index and, in step 506, the list is appended to the FIFO queue. In step 508, it is determined whether the FIFO queue is empty. If so, the process returns to step 502 where the index pointer is again advanced. However, if the FIFO queue is not empty, the process proceeds to step 510 where the thread is removed from head of the FIFO queue and executed as the currently running thread. The process exits in step 512.

It should be understood that the loop in steps 502-508 is actually the system 'idle' task. It exits when an external hardware event (interrupt) causes a thread to become scheduled on the ring. Alternatively, the implementation may detect the lack of anything to execute and either switch to an explicit 'idle' task or place the CPU in to a power saving mode.

Figure 6:
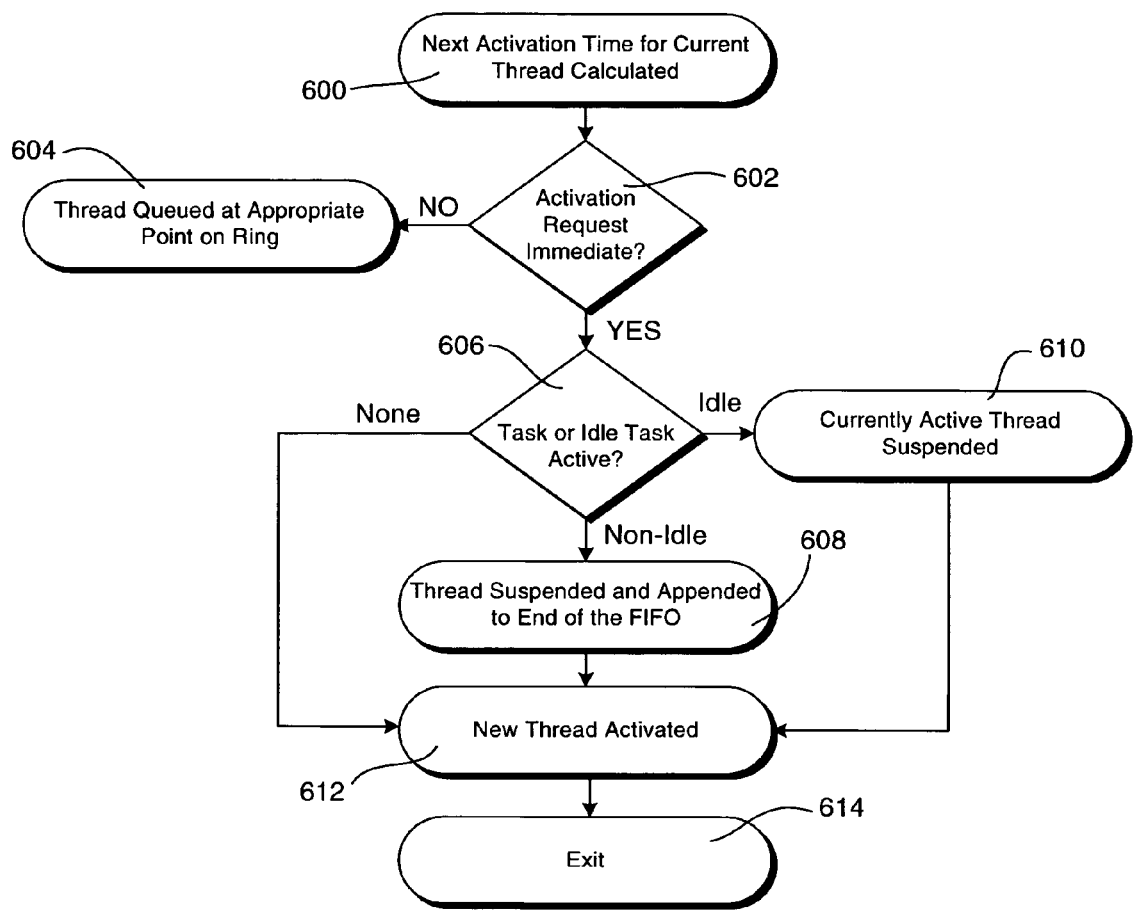
FIG. 6 is a flow diagram illustrating one embodiment of a method for responding to such an external event.

Another scenario regarding thread activation and execution may be initiated by an external event such as a message posted from another thread or activation triggered by an external hardware interrupt request. Referring now to FIG. 6, there is shown a flow diagram illustrating one embodiment of a method for responding to such an event. Initially, in step 600, the next activation time for the currently running thread is computed in the manner briefly described above in step 402. In step 602, it is determined whether the activation request is for immediate activation of a thread. If not, the thread is queued at an appropriate point on the timing ring corresponding to the requested timing in step 604.

If it is determined in step 602 that the external event requests immediate activation of a thread, it is next determined whether any task or idle task is presently active in step 606. If a non-idle task is currently active, the thread to be activated is appended to the end of the FIFO queue relating to the present time slot in step 608. If it is determined that an idle task is active, the current thread is suspended in step 610 and, the new thread is activated in step 612. If no tasks (either idle or otherwise) is presently active, the process simply jumps to step 612. The process exits in step 614.

Referring now to one exemplary embodiment of a method for computing the time to next execute a thread, a dual leaky-bucket calculation may be used to determine the next point at which a thread will receive a CPU time slot allocation. Such a calculation permits the use of ATM-like QoS (Quality of Service) classes such as VBR (variable bit rate), thus permitting a fixed period at which a task can receive a high CPU allocation ('burst' rate) and a smaller sustainable CPU rate that comes in to effect if the task continues to demand CPU time.

The leaky bucket model normally assumes fixed rates of credit flow in to the buckets. It is proposed to extend this scheme such that the leaky bucket parameters may be controlled in real time in response to the level of demand for a task. In a message based operating system, the leaky bucket flow parameters may be a mathematical function of the thread's input queue depth. Such a scheme effectively combines a hybrid VBR plus weighted-fair-queuing CPU allocation scheme for the thread. The VBR properties protect against 'run-away' threads that try to use the entire CPU, while the weighted-fair-queuing adaptation allows dynamic load balancing between threads. This scheme has the property of being relatively simple to implement, but has the drawback of still being constrained by the fixed, finite CPU resource that is assumed when assigning the basic leaky bucket parameters. In one embodiment, this constraint may be fixed as a partitioning of a fixed portion of the CPU assigned intrinsically to threads and combined with a movable portion that is carried by means of message exchange.

The time calculation is translated to a slot index at which the thread should be inserted. The calculation should assume that each slot is executed for the full period of the time scheduler (i.e., the assumption is of a system in which all threads wish to run continuously and do not suspend themselves). In practice, threads will often actively suspend themselves rather than being passively suspended by a pre-emptive scheduling decisions. The effect of this is to accelerate processing of the ring, potentially allowing those threads that are still runnable to receive a higher level of CPU than actually requested by their QoS parameters.

There is a strong analogy here with the shaping of network traffic such as ATM cells, where a particular data stream has an allocation of bandwidth that it can use on average, but it is allowed to vary above and below that rate in the short term. For exampled, in a VBR-like (or leaky-bucket) calculation, the thread is allowed a certain proportion of the CPU on average. However, the amount of actual CPU resources awarded to the thread can exceed this amount for short periods. However, when this happens, the thread then uses up its "credit" (the level goes down in the leaky bucket analogy), so that it will get a smaller proportion of the CPU for a while afterwards to restore the average. Each time the thread is suspended, a calculation is performed to determine at what time the thread should be resumed. On average this will be the slot time divided by the proportion of CPU allocated to this thread. However, if its credit is high, the time until next activation is reduced, thereby allowing the thread to "catch up". The time is then rounded to a whole number of slots to determine the next insertion point on the ring.

To optimize the search for the next active execution slot, a bit-map may be maintained of those slots that contain a non-empty queue. Bits are set in the map when an entry is added to a queue, and cleared when the queue is removed from the ring. Many modern processors provide a fast 'count-leading-zeros' machine instruction that can then be used to implement the search pattern efficiently. For example, an ARM implementation using a ring of 32 entries can be searched by the following sequence:

```
ldr   r0, index      ; Index number (0-31)
ldr   r1, map        ; Availability bitmap
movs  r2, r1,        ; Rotate map by the current index value
      rol r0
beq   go_idle        ; Jump if no entries present on the queue - run
                       idle task
clz   r3, r2         ; Count the number of leading zeros to get offset
                       to next queue
add   r0, r0, r3     ; Calculate the next index value to
and   r0, r0, #31    ; Modulo ring size to get index of next non-empty slot
                     ; Can now use r0 to load the next thread from
                       the queue
```

It should be understood that the general implementation of such software search algorithms may be computationally expensive if the ring size is large (although if you need to search hard, it's because there are no threads that need to be run urgently).

The scheduling methodology described above may be implemented to provide near perfect long-term CPU guarantees under full software control. However, limitations exist relating to the response latency of the system. For example, in a system with n threads that are runnable and a timer period p, the latency for a newly created task may be as great as n*p in circumstances where each thread requests execution at each time slot. In many circumstances, this latency period is unacceptably large for hard-real-time functions, such as threads that implement traditional interrupt handler functionality and which require latencies that are generally smaller than p alone.

To resolve this limitation, a thread priority concept is combined with the above-describing scheduling scheme already outlined. A given system will typically require a small number of distinct thread priority levels. Four such levels may be mapped to the following functions: (i) non-real-time threads (e.g., SNMP (simple network management protocol) handling); (ii) soft-real-time threads (e.g., network data transport); (iii) hard-real-time threads (e.g., voice traffic handling); and (iv) critical-real-time threads (e.g., hardware interrupt handlers with strict latency and performance constraints). In accordance with one embodiment of the present invention, a separate timing ring and FIFO structure is provided for each priority level. Additionally, in the proposed scheme, each thread has a fixed priority mapping, although it should be understood that the use of dynamically adaptive priority schemes is within the scope of the present invention.

Figure 7:
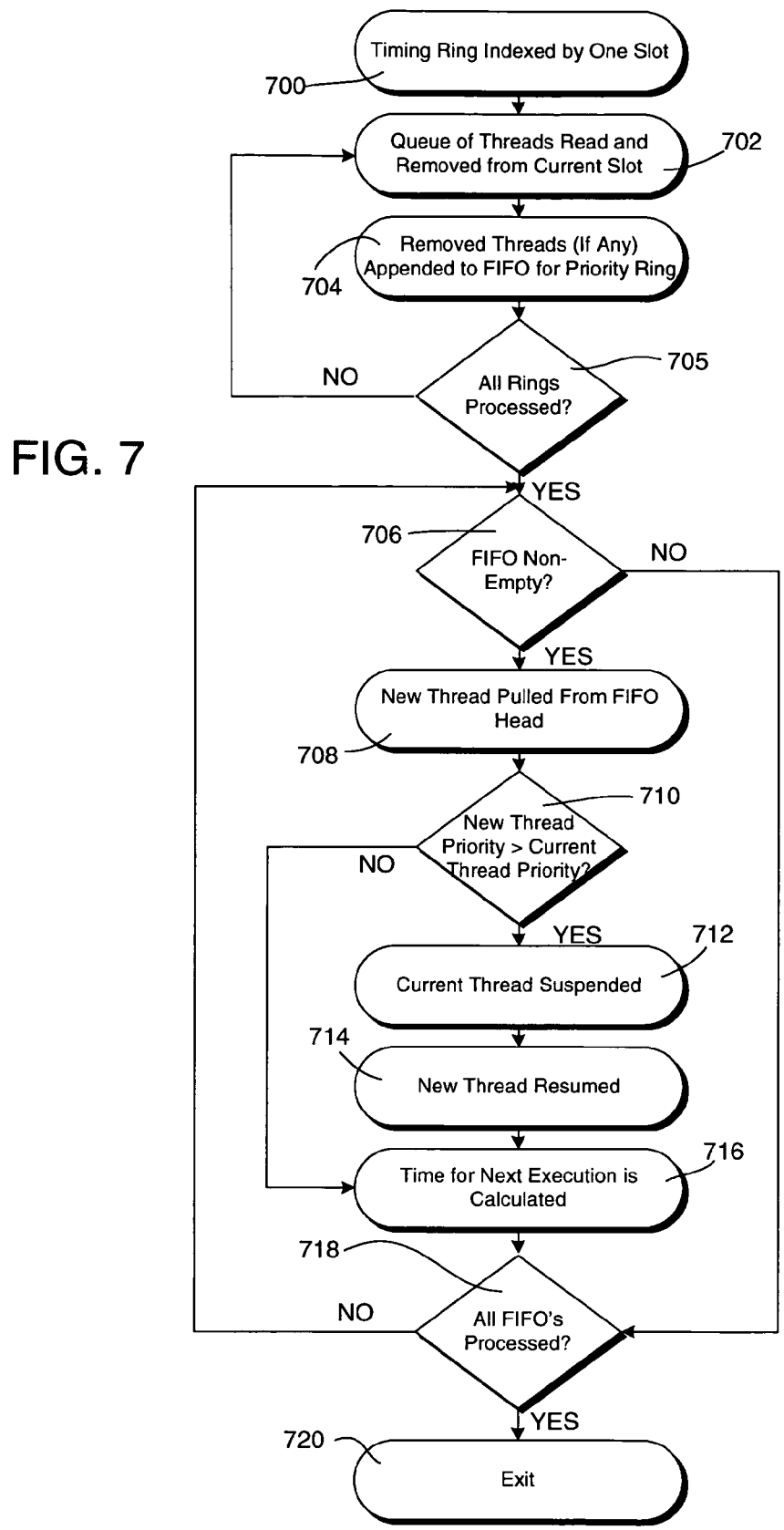
FIG. 7 is a flow diagram illustrating one embodiment of a method for activating a thread in response to the expiration of a time interval or the voluntary suspension of a currently running thread.

The priority adaptation modifies the search process from that used with a single ring. Referring now to FIG. 7, there is shown a flow diagram illustrating one embodiment of a method for activating a thread in response to the expiration of a time interval or the voluntary suspension of a currently running thread. In step 700, as above, the timing ring index is incremented by one slot. It should be understood that in one embodiment, a single pointer index is utilized by all timing rings, although multiple indexes may also be utilized. Next, for each ring, starting from the highest priority running to the lowest priority, the queue of threads at the current slot is read in step 702 and removed from the current slot. Next, the removed queue, if any, is appended to the FIFO associated with the priority ring in step 704. It is then determined in step 705 whether all priority rings have been processed. If not, the process then returns to step 702 for the next priority level ring.

Once all four rings have been processed, the FIFO's for each ring are processed, preferably beginning with the highest priority running to the lowest priority. In step 706, it is determined whether the FIFO is non-empty. If so, a new thread is pulled from the head of the FIFO in step 708. Next, in step 710, it is determined whether the priority of the new thread is greater than the priority of the currently executing thread. If so, the current thread is suspended in step 712 and the new thread is resumed in step 714, thereby making it the current thread. Following step 714, or if the new thread is not equal to the currently executing thread, the time at which the current thread should next run and be inserted on the ring is computed in step 716. If it was determined in step 706 that the FIFO was empty, the process advances to the next FIFO, if any, in step 718 and returns to step 706. If no tasks are currently requesting activation, the process returns to step 700 where the index pointer is incremented to the next slot. The process exits in step 720.

Figure 8:
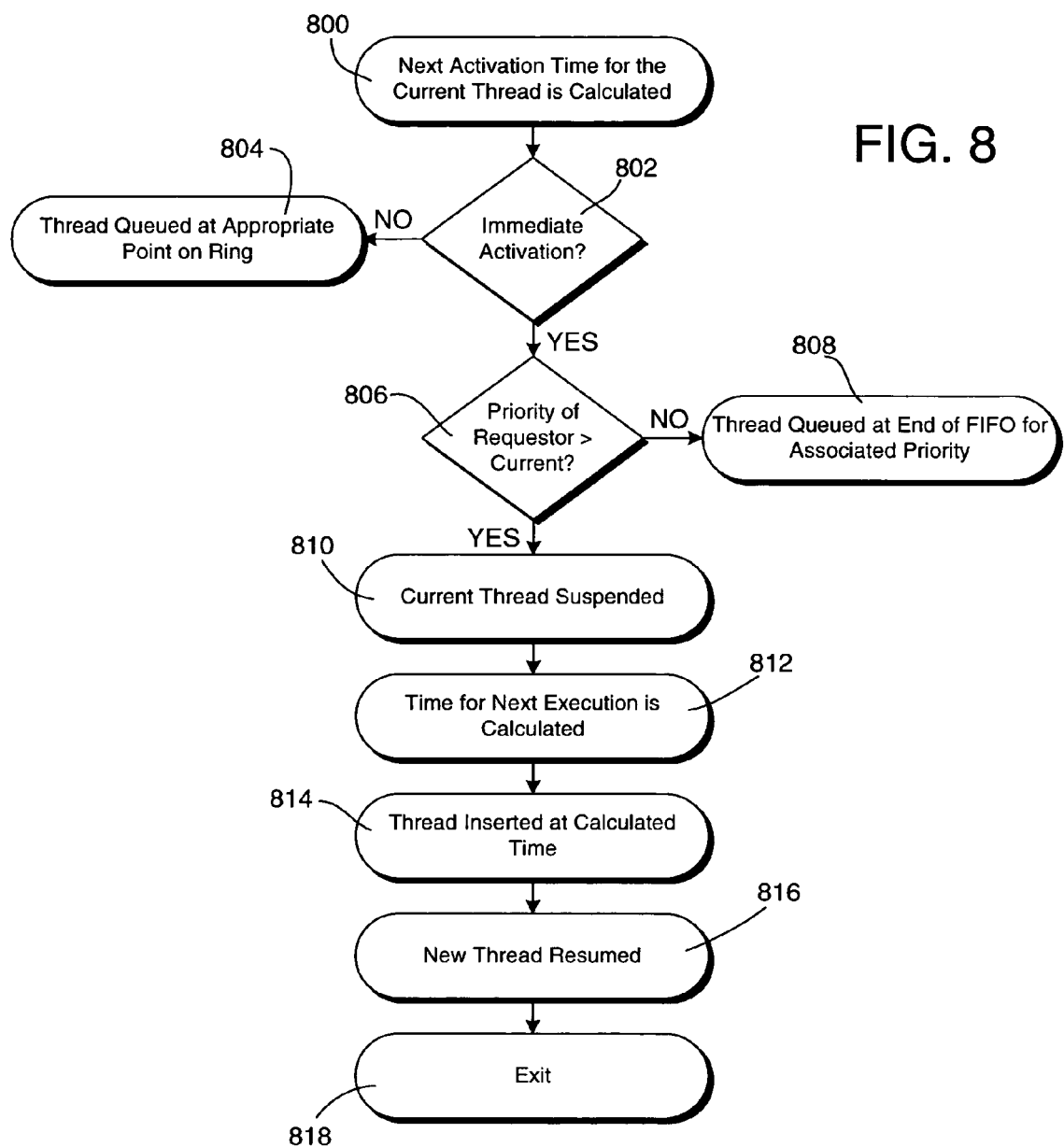
FIG. 8 is a flow diagram illustrating one embodiment of a method for responding to thread activation triggered by an external event incorporating priory levels.

Referring now to FIG. 8, there is shown a flow diagram illustrating one embodiment of a method for responding to thread activation triggered by an external event incorporating the priory levels identified above. Initially, in step 800, the next activation time for the currently running thread is computer in the manner briefly described above in step 402 above. In step 802, it is determined whether the activation request is for immediate activation of a thread. If not, the thread is queued at an appropriate point on the timing ring corresponding to the requested timing in step 804.

If it is determined in step 802 that the external event requests immediate activation of a thread, it is next determined in step 806 whether the priority of the requesting thread is greater than that of the currently executing thread. If not, the requesting thread is queued at the end of the FIFO for the associated priority level in step 808. However, if the requesting thread's priority is greater than the currently executing thread's priority, the current thread is suspended in step 810. Next, in step 812, the time at which the current thread should be next run is calculated and the thread is inserted into an appropriate point on the ring in step 814. In step 816, the new thread is resumed and made into the currently thread. The process exits in step 818.

As a further optimization, the implicit search loop may be terminated if there are no threads queued anywhere in the system. In this case, the controlled CPU may be placed in to a power saving mode, or an explicit 'idle' thread selected and made the current task. For software implementations, this decision may be optimized by maintaining a bitmap of ring slots that flag which ring entries contain at least one queued thread. Further optimization is also possible by using such bitmaps to implement a fast-search algorithm for the next non-empty slot, although the importance of such an optimization is diminished since it is only invoked when the system as a whole is not heavily loaded.

Figure 9:
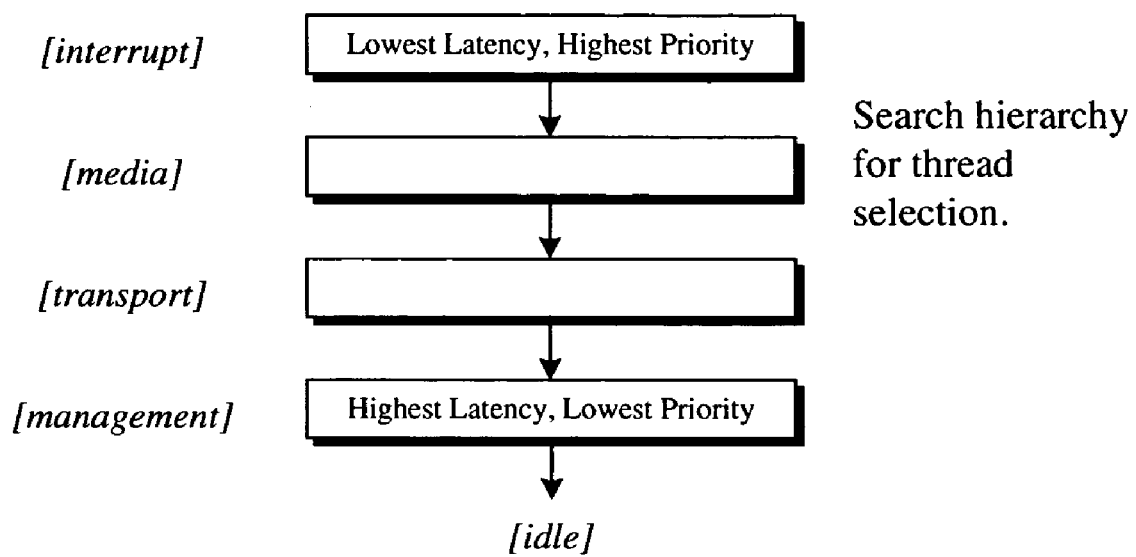
FIG. 9 is a generalized block diagram illustrating one embodiment of a search hierarchy for use with the present invention.

Referring now to FIG. 9, there is shown a generalized block diagram illustrating one embodiment of a search hierarchy implemented by the above methodologies. As shown in FIG. 9, in one embodiment, a very small number of different priority levels are utilized. Furthermore, thread priorities may be fixed. However, in an alternative embodiment, a priority inheritance mechanism may be employed to raise the priority of any thread that a high priority thread is dependent (and blocking) on. In this manner, lower level threads will not prohibit the timely execution of dependent higher-priority threads. Such inheritance may also encompass the other scheduling parameters associated with the blocked thread.

As described, the scheme is not robust against denial of service attacks due to a rogue high priority thread monopolizing the CPU resource. However, careful control of the QoS rate control parameters may be used to minimize such attacks, for example, by limiting the sustainable rate at which a high priority thread receives CPU time.

An alternative approach is to modify the FIFO search algorithm given earlier, so that search sequence does not always favor the highest priority FIFO. For example, after n consecutive time slots from a high priority thread, a single slot may always be scheduled from a lower priority thread. This would mechanism ensures that low priority tasks are guaranteed to receive some CPU time, thereby permitting the use of low-priority background threads that can explicitly police against rogue code using algorithms that are more computationally sophisticated than are possible in the low-level scheduler (e.g., using knowledge of the purpose of the rogue code).

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. A method for scheduling thread execution, comprising:
    maintaining a circular array structure having a plurality of time slots therein, wherein each of the plurality of time slots corresponds to a timeslice during which CPU resources are allocated to a particular thread;
    configuring each time slot in the circular array to include a queue of threads scheduled for execution during that time slot;
    maintaining a pointer index for referencing one time slot in the circular array and whereby advancement through the circular array is provided by advancing the pointer index;
    maintaining an array of threads requesting immediate CPU resource allocation based on the queue of threads;
    calculating a next time slot during which a currently executing thread should next resume execution;
    appending the currently executing thread to the queue of threads scheduled for execution at the calculated time slot;
    identifying a next sequential non-empty time slot containing a queue of threads scheduled for execution during that time slot;
    updating the pointer index to point to the identified next sequential non-empty time slot;
    appending any contents of the indexed time slot to the array of threads requesting immediate CPU resource allocation;
    removing the thread at a top of the array of threads requesting immediate CPU resource allocation;
    determining whether the thread at the top of the array of threads requesting immediate CPU resource allocation is identical to the currently executing thread;
    maintaining execution of the currently executing thread for the following time slot if it is determined that the thread at the top of the array of threads requesting immediate CPU resource allocation is identical to the currently executing thread;
    suspending the currently executing thread; and
    activating the thread at the top of the array of threads requesting immediate CPU resource allocation if it is determined that the thread at the top of the array of threads requesting immediate CPU resource allocation is not identical to the currently executing thread.

2. The method of claim 1, wherein each timeslice is between 10 and 100 microseconds.

3. The method of claim 1, wherein the array of threads requesting immediate CPU resource allocation includes a first-in-first-out (FIFO) structure.

4. The method of claim 1, wherein the step of suspending the currently executing thread includes:
    receiving a self-suspend request from the currently executing thread.

5. The method of claim 4, further comprising:
    advancing the index pointer by one time slot;
    removing a list of any threads to be executed at the indexed time slot and appending them to the array of threads requesting immediate CPU resource allocation; determining whether the array of threads requesting immediate CPU resource allocation is empty;
    returning to the step of advancing the index pointer by one slot if it is determined that the array of threads requesting immediate CPU resource allocation does not contain any threads; and
    removing and activating the thread at the top of the array of threads requesting immediate CPU resource allocation if it is determined that the array of threads requesting immediate CPU resource allocation is not empty.

6. The method of claim 1, further comprising:
    receiving an external event interrupt requesting CPU resource allocation for a new thread;
    calculating a next time slot during which the currently executing thread should next resume execution;
    determining whether the external event interrupt is requesting immediate CPU resource allocation;
    appending the new thread to a queue on a time slot on the circular array if it is determined that the external event interrupt is not requesting immediate CPU resource allocation;
    determining a type of thread currently executing;
    activating the new thread if no thread is currently executing;
    performing the following steps if it is determined that a non-idle thread is currently executing:
        suspending the currently executing thread;
        appending the currently executing thread to the end of the array of threads requesting immediate CPU resource allocation; and
        activating the new thread;
    performing the following steps if it is determined that an idle thread is currently executing:
        suspending the currently executing thread; and
        activating the new thread.

7. A method for scheduling thread execution, comprising:
    maintaining a plurality of circular array structures associated with a plurality of discrete thread priorities, each having a plurality of time slots therein, wherein each of the plurality of time slots corresponds to a timeslice during which CPU resources are allocated to a particular thread;

configuring each time slot in each of the circular arrays to include a queue of threads scheduled for execution during that time slot;
maintaining at least one pointer index for referencing one time slot in each of the circular arrays, whereby advancement through the circular arrays is provided by advancing the pointer index;
maintaining an array of threads requesting immediate CPU resource allocation for each of the plurality of circular arrays;
assigning each thread to be executed a specific priority;
incrementing the index pointer by one slot;
removing, for each of the plurality of circular arrays, each queue of threads for the indexed time slot;
appending each removed thread to the array of threads requesting immediate CPU resource allocation associated with its respective circular array;
determining whether the array of threads requesting immediate CPU resource allocation associated with a first circular array contains any threads;
proceeding to a next circular array if the array of threads requesting immediate CPU resource allocation is empty;
extracting a top thread if the array of threads requesting immediate CPU resource allocation contains any threads;
determining whether a priority of the top thread is greater than a priority of the currently executing thread;
calculating a time for next execution of the top thread if it is determined that the priority of the top thread is not greater than the priority of the currently executing thread; performing the following steps if it is determined that the priority of the top thread is greater than a priority of the currently executing thread:
suspending the currently executing thread;
activating the top thread; and
calculating the time of next execution for the suspended thread;
determining whether each of the array of threads requesting immediate CPU resource allocation associated with each of the circular arrays has been processed; and
proceeding to the next array of threads requesting immediate CPU resource allocation if it is determined that not all arrays of threads requesting immediate CPU resource allocation have been processed.

8. The method of claim 7, wherein each of the plurality of circular arrays corresponds to one of four assigned priority levels: a non-real-time priority; a soft-real-time priority; a hard-real-time priority; and a critical-real-time priority.

9. The method of claim 7, further comprising:
receiving an external event interrupt requesting CPU resource allocation for a new thread;
calculating a next time slot during which the currently executing thread should next resume execution;
determining whether the external event interrupt is requesting immediate CPU resource allocation;
appending the new thread to a queue on a time slot on the circular array if it is determined that the external event interrupt is not requesting immediate CPU resource allocation;
determining whether a priority of the new thread is greater than a priority of the currently executing thread;
appending the new thread to the end of the array of threads requesting immediate CPU resources for the associated priority if it is determined that the priority of the new thread is not greater than the priority of the currently executing thread; and performing the following steps if it is determined that the priority of the new thread is greater than the priority of the currently executing thread:
suspending the currently executing thread;
calculating the time for next execution for the currently executing thread appending the currently executing thread to array associated with the calculated time slot; and
activating the new thread.

10. A computer-readable storage medium storing a program for scheduling thread execution, the program, when executed by a processor, causing a computer to perform:
maintaining a plurality of circular array structures associated with a plurality of discrete thread priorities, each having a plurality of time slots therein, wherein each of the plurality of time slots corresponds to a timeslice during which CPU resources are allocated to a particular thread;
configuring each time slot in each of the circular arrays to include a queue of threads scheduled for execution during that time slot;
maintaining at least one pointer index for referencing one time slot in each of the circular arrays, whereby advancement through the circular arrays is provided by advancing the pointer index;
maintaining an array of threads requesting immediate CPU resource allocation for each of the plurality of circular arrays;
assigning each thread to be executed a specific priority;
incrementing the index pointer by one slot;
removing, for each of the plurality of circular arrays, each queue of threads for the indexed time slot;
appending each removed thread to the array of threads requesting immediate CPU resource allocation associated with its respective circular array;
determining whether the array of threads requesting immediate CPU resource allocation associated with a first circular array contains any threads;
proceeding to a next circular array if the array of threads requesting immediate CPU resource allocation is empty;
extracting a top thread if the array of threads requesting immediate CPU resource allocation contains any threads;
determining whether a priority of the top thread is greater than a priority of the currently executing thread;
calculating a time for next execution of the top thread if it is determined that the priority of the top thread is not greater than the priority of the currently executing thread;
performing the following steps if it is determined that the priority of the top thread is greater than a priority of the currently executing thread:
suspending the currently executing thread;
activating the top thread; and
calculating the time of next execution for the previously executing thread;
determining whether each of the array of threads requesting immediate CPU resource allocation associated with each of the circular arrays has been processed; and
proceeding to the next array of threads requesting immediate CPU resource allocation if it is determined that not all arrays of threads requesting immediate CPU resource allocation have been processed.

11. The computer-readable storage medium of claim 10, wherein each of the plurality of circular arrays corresponds to one of four assigned priority levels: a non-real-time priority; a soft-real-time priority; a hard-real-time priority; and a critical-real-time priority.

12. The computer-readable storage medium of claim 10, the program further causing the computer to perform:
   receiving an external event interrupt requesting CPU resource allocation for a new thread;
   calculating a next time slot during which the currently executing thread should next resume execution;
   determining whether the external event interrupt is requesting immediate CPU resource allocation;
   appending the new thread to a queue on a time slot on the circular array if it is determined that the external event interrupt is not requesting immediate CPU resource allocation;
   determining whether a priority of the new thread is greater than a priority of the currently executing thread;
   appending the new thread to the end of the array of threads requesting immediate CPU resources for the associated priority if it is determined that the priority of the new thread is not greater than the priority of the currently executing thread; and
   performing the following steps if it is determined that the priority of the new thread is greater than the priority of the currently executing thread:
   suspending the currently executing thread;
   calculating the time for next execution for the currently executing thread
   appending the currently executing thread to array associated with the calculated time slot; and
   activating the new thread.

13. A computer-readable storage medium storing a program for scheduling thread execution, the program, when executed by a processor, causing a computer to perform:
   maintaining a circular array structure having a plurality of time slots therein, wherein each of the plurality of time slots corresponds to a timeslice during which CPU resources are allocated to a particular thread;
   configuring each time slot in the circular array to include a queue of threads scheduled for execution during that time slot;
   maintaining a pointer index for referencing one time slot in the circular array and whereby advancement through the circular array is provided by advancing the pointer index;
   maintaining an array of threads requesting immediate CPU resource allocation;
   calculating a next time slot during which a currently executing thread should next resume execution;
   appending the currently executing thread to the queue of threads scheduled for execution at the calculated time slot;
   identifying a next sequential non-empty time slot;
   updating the pointer index to point to the identified next sequential non-empty time slot;
   appending any contents of the indexed time slot to the array of threads requesting immediate CPU resource allocation;
   removing the thread at a top of the array of threads requesting immediate CPU resource allocation;
   determining whether the thread at the top of the array of threads requesting immediate CPU resource allocation is identical to the currently executing thread;
   maintaining execution of the currently executing thread for the following time slot if it is determined that the thread at the top of the array of threads requesting immediate CPU resource allocation is identical to the currently executing thread;
   suspending the currently executing thread; and
   activating the thread at the top of the array of threads requesting immediate CPU resource allocation if it is determined that the thread at the top of the array of threads requesting immediate CPU resource allocation is not identical to the currently executing thread.

14. The computer-readable storage medium of claim 13, wherein each timeslice is between 10 and 100 microseconds.

15. The computer-readable storage medium of claim 13, wherein the array of threads requesting immediate CPU resource allocation includes a first-in-first-out (FIFO) structure.

16. The computer-readable storage medium of claim 13, wherein suspending the currently executing thread further comprises receiving a self-suspend request from the currently executing thread.

17. The computer-readable storage medium of claim 16, further causing the computer to perform:
   advancing the index pointer by one time slot;
   removing a list of any threads to be executed at the indexed time slot and appending them to the array of threads requesting immediate CPU resource allocation;
   determining whether the array of threads requesting immediate CPU resource allocation is empty;
   returning to the step of advancing the index pointer by one slot if it is determined that the array of threads requesting immediate CPU resource allocation does not contain any threads; and
   removing and activating the thread at the top of the array of threads requesting immediate CPU resource allocation if it is determined that the array of threads requesting immediate CPU resource allocation is not empty.

18. The computer-readable storage medium of claim 13, further causing the computer to perform:
   receiving an external event interrupt requesting CPU resource allocation for a new thread;
   calculating a next time slot during which the currently executing thread should next resume execution;
   determining whether the external event interrupt is requesting immediate CPU resource allocation;
   appending the new thread to a queue on a time slot on the circular array if it is determined that the external event interrupt is not requesting immediate CPU resource allocation;
   determining the type of thread currently executing;
   activating the new thread if no thread is currently executing;
   performing the following steps if it is determined that a non-idle thread is currently executing:
   suspending the currently executing thread;
   appending the currently executing thread to the end of the array of threads requesting immediate CPU resource allocation; and
   activating the new thread;
   performing the following steps if it is determined that an idle thread is currently executing:
   suspending the currently executing thread; and
   activating the new thread.

* * * * *